April 6, 1965    D. DANIELS    3,176,973
CLAMPING MECHANISM
Filed Nov. 2, 1962    2 Sheets-Sheet 1

INVENTOR.
Dennis Daniels
BY
ATTORNEYS

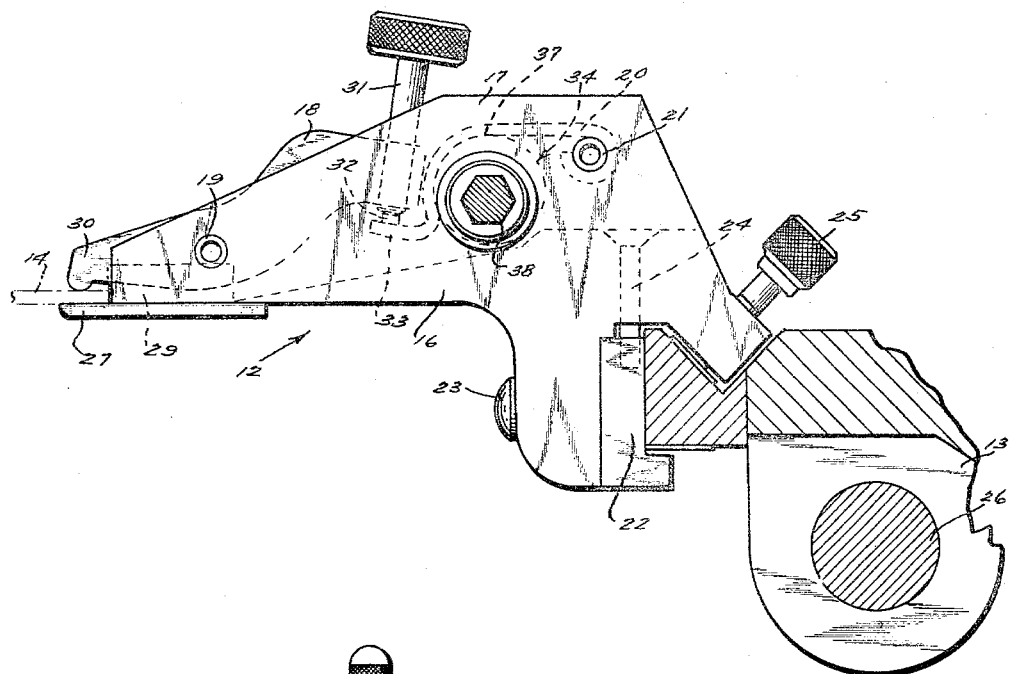
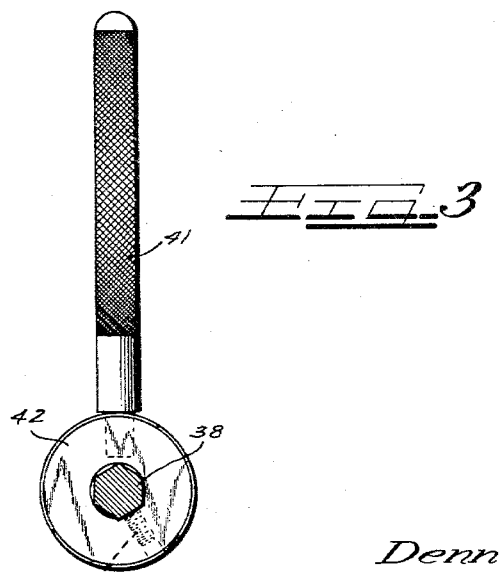

United States Patent Office 3,176,973
Patented Apr. 6, 1965

3,176,973
CLAMPING MECHANISM
Dennis Daniels, Williamsville, N.Y., assignor to Houdaille Industries, Inc., Buffalo, N.Y., a corporation of Michigan
Filed Nov. 2, 1962, Ser. No. 235,046
19 Claims. (Cl. 269—153)

This invention relates generally to clamping mechanisms, and more specifically to a clamping mechanism which is adapted to be secured to a movable support as well as to a workpiece for transferring movements of the support to such workpiece.

Although the principles of the present invention may be included in various devices such as machine tools, a particularly useful application is made in a punching machine having associated therewith a template-type of duplicator or follower mechanism. The follower mechanism comprises a support which is positionable to various positions determined by apertures in or the profile of a template. The support further includes a clamping mechanism in accordance with this invention which clamps onto the workpiece for effecting movement of the workpiece to various positions with respect to the punching machine.

A punching machine of this type is typically employed with a successive series of workpieces so that it becomes necessary to release a finished workpiece and to replace it with a further workpiece on which machining is to be done. It has been found that clamp structures employed for such purpose have been cumbersome to use in that slow or tedious time-wasting adjustment has been necessary to insure proper clamping of each of the successive workpieces, such adjustment being necessary for each successive workpiece. One cause of this is that thickness tolerances which are allowed during the manufacture of sheet metal, permit the thickness to vary to such an extent that a predetermined precise thickness of workpiece cannot be accurately predicted. Due to this fact, readjustment of clamp settings has been necessary heretofore. It has also been found that a particular machine may be called upon to work on a small workpiece wherein the clamps must be close together, and at a later time, to work on a workpiece wherein a pair of clamps must be spaced a considerable distance from each other. Ease in adjusting the spacing between them has therefore been found to be necessary. Still further, when a number of workpieces are to be successively machined, it is highly desirable that a minimum of operator's time be employed for the non-productive steps of clamping and unclamping the workpiece.

Accordingly, it is an object of the present invention to provide an improved clamping mechanism.

A further object of the present invention is to provide a structure which includes a pair of clamps under the operative control of a single actuator.

A still further object of the present invention is to provide an adjustably positionable or slidable actuator for operating one or more clamps, such adjustable positioning enabling the operator to apply an opening or closing force to the actuator at a point remote from the clamp itself which is more readily accessible and convenient to the operator.

Yet another object of the present invention is to provide a clamping device having means for effecting quick release or clamping.

A still further object of the present invention is to provide a clamping device wherein the device automatically compensates for thickness variations of the workpiece.

A still further object of the present invention is to provide a clamping mechanism which has adjustable means for determining the approximate closed setting thereof and which has further manually actuatable means for opening and closing the same.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

FIGURE 2 is an elevational view taken along line II—II of FIGURE 1, the same being shown partly in cross-section; and FIGURE 3 is an elevational view taken along line III—III of FIGURE 1, also shown partly in cross-section.

As shown on the drawings:

Figure 1:
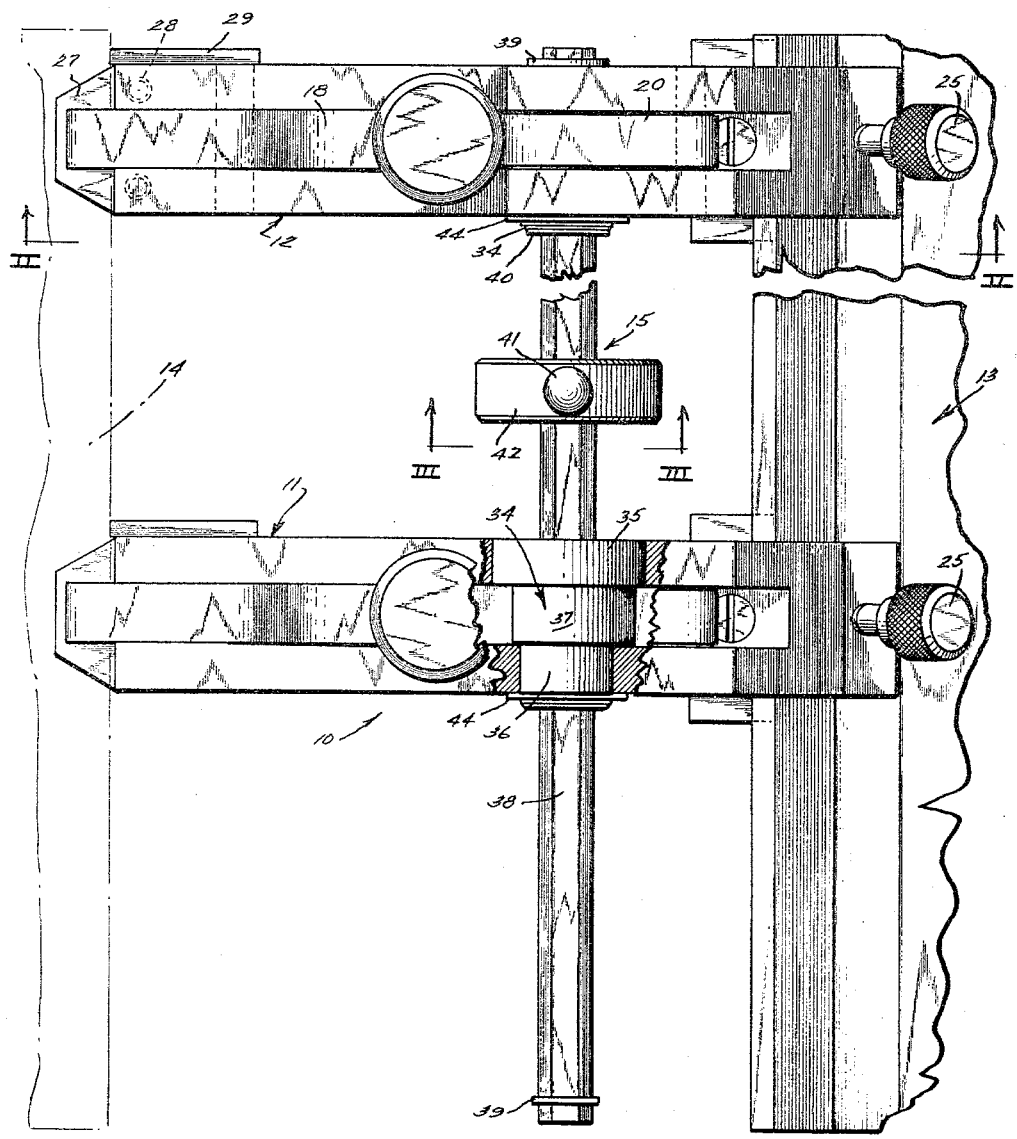
FIGURE 1 is a plan view of a clamping mechanism provided in accordance with the principles of the present invention, the view being partially broken away and shown in cross-section.

The principles of this invention are particularly useful when embodied in a clamping mechanism such as illustrated in FIGURE 1, generally indicated by the numeral 10. The clamping mechanism 10 includes a pair of parallel spaced identical clamp assemblies 11, 12, each adapted at one end to be movably secured to a support 13, and each adapted at the other end to be releasably clamped against a workpiece 14. The clamp assemblies 11, 12, are under the operative control of an actuating means generally indicated at 15.

The clamp assemblies 11 and 12, are identical and therefore the description which follows for the clamp assembly 12 shown in FIGURE 2 is equally applicable to the clamp assembly 11.

The clamp assembly 12 includes a body 16 having a bifurcated upper portion 17 in which there is disposed a rigid clamp arm 18 pivoted to the body 16 by a pin 19, and a spring 20 also pivoted to the body 16 by a pin 21.

The body 16 is provided with a wear block 22 which is secured thereto as by screws 23, 24. The body 16 further is provided with a locking screw 25 of the thumb type.

The support 13 to which the clamp assemblies 11 and 12 are secured, is movable slidably on circular bar means such as 26, the bar means 26 being also movable by other means (not shown) to enable movement in a direction transverse to that described.

As best seen in FIGURE 1, the size of the workpiece 14 may vary considerably, and therefore the thumbscrew 25 may be loosened so that the clamp 12 may be moved with respect to the support 13 and clamped thereto at any position selected. As explained in greater detail hereafter, at least one of the clamps, such as 11 herein, may be moved at a time to a different position on the support 13 without loosening of the other clamp 12.

The body 16 is provided with a lower jaw plate 27 which is secured thereto as by means of a pair of screws 28 shown in FIGURE 1. The lower surface of the workpiece 14 rests on the upper surface of the jaw plate 27. The body 16 is further provided with an edge stop plate 29 which is also secured thereto by means of screws which are not illustrated. As best seen in FIGURE 1, the left edge of the plate 29 is engaged by the workpiece 14 and thus the plates 29 of the two clamps jointly locate one edge of the workpiece 14. The rigid clamp arm 18, being pivoted on the pin 19 has one end 30 which is disposed above the bottom jaw plate 27 to define an opening therebetween for receiving the workpiece 14. Preferably, the pin 19 is located off the center of the rigid arm 18 so that there is a mass of the arm 18 which, under the influence of gravity, biases or tends to cause the arm 18 to pivot clockwise as shown in FIGURE 2, namely in a direction which opens the gap at the one end 30 thereof.

At the other end of the rigid clamp arm 18, there is provided a screw 31 which here comprises a thumbscrew, the mass of which aids in providing a gravity bias on the rigid arm 18. The lower end of the thumbscrew 31, indicated at 32, bears against an end 33 of the spring 20 so that while the spring 20 normally would similarly be biased by gravity to pivot downwardly about the pin 21, since it is lighter in weight, any friction at the pin 21 is overcome by the excess mass of the clamp arm 18 combined with the screw 31.

A cam indicated at 34 is disposed beneath an arcuate portion of the spring 20 so that when the cam 34 is rotated, the spring 20 is caused to pivot in opposite directions in response to the nature of the rotation of the cam 34. As best seen in FIGURE 1, the cam 34 preferably includes a pair of concentric bearing portions 35, 36 respectively rotatably supported in the bifurcated portions of the body 16, the central portion of the cam 34 comprising an eccentric cam track 37 which engages the undersurface of the spring 20. The eccentricity of the cam is of a magnitude of sufficient size to insure that when the cam has been rotated to pivot the clamp arm 18 against the workpiece 14, further pivoting is possible and will enable the cam to apply a yielding-causing force against the spring 20. This yieldability automatically compensates for thickness variations between successive workpieces 14 and insures a substantially constant clamping force thereagainst, even when a somewhat greater torque is applied to the cam 34.

The cam 34 is axially hollow and has a non-circular opening therethrough, the opening being of hexagonal cross-section in this embodiment, and being of a cross-sectional shape which corresponds to that of an elongated rotatable key 38 which forms a part of the actuating means 15. There is a slight clearance between the key 38 and the cam 34 so that there is provided therebetween a sliding connection which supports the key 38, and which enables either the key 38 to be moved axially with respect to the clamp 12, or which enables the clamp 12 to be moved with respect to the key 38. Thus the clamp 12 has means for adjusting the setting to compensate for different thicknesses of workpiece, coupled with a separate actuator for opening and closing the same, the size of the workpiece opening being further automatically compensated for thickness variations within a nominal workpiece thickness size.

Referring again to FIGURE 1, the pair of spaced clamps 11 and 12 may be secured by the lock screws 25 to any selected position on the support 13. Wherever they are positioned, the actuating means 15 is operative to serve as a quick release or clamp actuating device. To this end, the actuating means 15 includes the key 38 which is slidably received in each of the cams 34, and is provided at its ends with a pair of snap retaining rings 39, 39. If it is desired to retain the elongated key 38 against axial movement, a further snap ring 40 may be employed. If this be done as shown for the clamp 12, the clamp 11 should be left in a relatively slidable position with respect to the key 38. The actuating means 15 further includes a manual actuator or handle 41 secured to an annular member 42 which has a sliding connection with the key 38, and which preferably includes a setscrew 43 so that if desired, the handle 41 may be locked in a particular setting.

By removal of the snap ring 39 shown at the lower portion of FIGURE 1, the relative positions of the locking handle 41 and the clamp 11 may be transposed since each of these assemblies has a slidable connection with the key 38.

As also best seen in FIGURE 1, the cam 34 is retained in the body 16 by means of a retaining ring 44.

Thus there has been provided a single actuator or actuating means 15 which is operative on two clamps 11, 12, the actuator having a slidable connection with one or both of the clamps, and being of the quick release type wherein a simple movement of the operator's hand may be employed to actuate the same.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A clamping mechanism, comprising in combination:
(a) a body having means by which it may be secured to a support;
(b) a clamp arm pivotally supported on said body for closing at one end onto a workpiece;
(c) a spring secured to said body and having such construction as to act on said arm remotely from said one end; and
(d) a cam movably supported by said body and engageable with said spring to act therethrough to pivot the clamp arm in a closing direction.

2. A clamping mechanism, comprising in combination:
(a) a body having means by which it may be secured to a support;
(b) a clamp arm pivotally supported on said body for closing at one end onto a workpiece, said clamp arm being biased by gravity to tend to pivot in an opening direction;
(c) a spring pivotally secured to said body and having such construction as to act on said arm remotely from said end for closing said arm, said spring being pivoted by said arm as it moves in an opening direction; and
(d) a cam movably supported by said body and engageable with said spring to act therethrough to pivot the clamp arm in a closing direction.

3. A clamping mechanism, comprising in combination:
(a) a body having means by which it may be secured to a support;
(b) a clamp arm pivotally supported on said body and at one end defining therewith a workpiece-receiving opening;
(c) a spring secured to said body and having such construction as to act on said arm at the other end thereof to close the opening at said one end; and
(d) a cam movably supported by said body and engageable with said spring to act therethrough to pivot the clamp arm in a closing direction, 4. A clamping mechanism, comprising in combination:
(a) a body having means by which it may be secured to a support;
(b) a rigid clamp arm pivotally supported on said body for closing at one end onto a workpiece;
(c) a spring secured to said body and having such construction as to act on said arm remotely from said one end; and
(d) a cam movably supported by said body and engageable with said spring to act therethrough to pivot the clamp arm in a closing direction, said cam having a rise of sufficient magnitude to insure yielding of said spring in response to further cam movement in the same direction after said arm has closed upon the workpiece.

5. A clamping mechanism, comprising in combination:
(a) a body having means by which it may be secured to a support;
(b) a clamp arm pivotally supported on said body and at one end defining therewith a workpiece-receiving opening;
(c) a screw secured to said arm and operative to vary the size of said opening;
(d) a spring secured to said body, and having such construction as to act on said arm remotely from said one end to close the opening at said one end; and (e) a cam movably supported by said body and engageable with said spring to act therethrough to pivot the clamp arm in a closing direction.

6. A clamping mechanism, comprising in combination:
(a) a body having means by which it may be secured to a support;
(b) a clamp arm pivotally supported on said body and at one end defining therewith a workpiece-receiving opening;
(c) a screw secured to said arm remotely from said one end and operative to vary the size of said opening;
(d) a spring secured to said body and having such construction as to act on said screw to close the opening at said one end; and
(e) a cam movably supported by said body and engageable with said spring to act therethrough to pivot the clamp arm in a closing direction.

7. A clamping mechanism, comprising in combination:
(a) a body having means by which it may be secured to a support;
(b) a rigid clamp arm pivotally supported on said body and at one end defining therewith a workpiece-receiving opening, said clamp arm being biased by gravity to tend to pivot in an opening direction;
(c) a screw secured to said arm remotely from said one end and operative to vary the size of said opening;
(d) a spring pivotally secured to said body and having such construction as to act on said screw to close the opening at said one end, said spring being pivoted by said arm as it moves in an opening direction; and
(e) a cam rotatably supported by said body and engageable with said spring to act therethrough to pivot the clamp arm in a closing direction, said cam having a rise of sufficient magnitude to insure yielding of said spring in response to further cam movement in the same direction after said arm has closed upon the workpiece.

8. A clamping mechanism, comprising in combination:
(a) a body having means by which it may be secured to a support;
(b) a clamp arm pivotally supported on said body for closing at one end onto a workpiece;
(c) a spring secured to said body and having such construction as to act on said arm remotely from said one end;
(d) a cam rotatably supported by said body and engageable with said spring to act therethrough to pivot the clamp arm in a closing direction; and
(e) actuating means secured to said cam for pivoting it.

9. A clamping mechanism, comprising in combination:
(a) a body having means by which it may be secured to a support;
(b) a clamp arm pivotally supported on said body for closing at one end onto a workpiece;
(c) a spring secured to said body and having such construction as to act on said arm remotely from said one end;
(d) a cam rotatably supported by said body and engageable with said spring to act therethrough to pivot the clamp arm in a closing direction; and
(e) an elongated key having a slidable driving connection with said cam for pivoting it.

10. A clamping mechanism, comprising in combination:
(a) a body having means by which it may be secured to a support;
(b) a clamp arm pivotally supported on said body for closing at one end onto a workpiece, said clamp arm being biased by gravity to tend to pivot in an opening direction; and
(c) manually actuatable cam means carried by said body and operative in response to rotation toward one position to pivot said clamp arm into clamping engagement with the workpiece, and operative in response to rotation toward another position to enable said clamp arm to pivot in a workpiece-releasing direction.

11. A clamping mechanism, comprising in combination:
(a) a body having means by which it may be secured to a support;
(b) a rigid clamp arm pivotally supported on said body and at one end defining therewith a workpiece-receiving opening;
(c) a screw secured to one of said body and said arm for adjusting the size of said opening; and
(d) manually actuatable cam means carried by said body and operative to transmit to said screw a force effective to pivot said clamp arm into clamping engagement with the workpiece.

12. A clamping mechanism, comprising in combination:
(a) a body having means by which it may be secured to a support;
(b) a clamp arm pivotally supported on said body and at one end defining therewith a workpiece-receiving opening;
(c) a screw secured to said arm remotely from said one end and operative to vary the size of said opening; and
(d) manually actuated cam means carried by said body and operative to apply a force to the inner end of said screw to pivot said clamp arm into clamping engagement with the workpiece.

13. A clamping mechanism, comprising in combination:
(a) a body having means by which it may be secured to a support;
(b) a clamp arm pivotally supported on said body for closing at one end onto a workpiece;
(c) cam means carried by said body and operative to pivot said clamp arm into clamping engagement with the workpiece; and
(d) an elongated key having a slidable driving connection with said cam means for effecting pivoting thereof from a selected position.

14. A clamping mechanism, comprising in combination:
(a) an elongated rotatable key;
(b) a pair of parallel spaced clamp assemblies having means by which they may be secured to a support, and each having a portion operative to close onto a workpiece, said clamp assemblies supporting said key for rotation about its axis and said assemblies being so constructed as to be simultaneously responsive to such rotation of said key to open or close; and
(c) actuating means secured to said key for rotating it.

15. A clamping mechanism, comprising in combination:
(a) an elongated rotatable key;
(b) a pair of parallel spaced clamp assemblies having means by which they may be secured to a support, and each having a portion operative to close onto a workpiece, each of said clamp assemblies having a sliding supporting connection with said key by which said key may be rotated about its axis and said assemblies being so constructed as to be simultaneously responsive to such rotation of said key to open or close; and
(c) actuating means secured to said key by which said key may be relatively moved axially and by which it may be rotated.

16. A clamping mechanism, comprising in combination:
(a) an elongated rotatable key;
(b) a clamp assembly having means by which it may be secured to a support and having means by which it may close onto a workpiece, said clamp assembly having a sliding supporting connection with said key by which said key is supported for rotation about its axis, and said assembly being so constructed as to be responsive to such rotation of said key to open or close; and (c) actuating means secured to said key by which said key may be moved axially relatively to said supporting mechanism and by which it may be rotated.

17. A clamping mechanism, comprising in combination:
(a) a body member having means by which it may be secured to a support;
(b) a rigid clamp arm member pivotally supported on said body member and at one end defining therewith a workpiece-receiving opening;
(c) a screw secured to one of said members and operative to adjust the size of said opening; and
(d) manually actuatable cam means pivoted on said body member and operative to apply a force to said pivotable clamp arm member for pivoting said clamp arm member into clamping engagement with the workpiece.

18. A clamping mechanism, comprising in combination:
(a) a body having means by which it may be secured to a support;
(b) a clamp arm pivotally supported on said body for closing at one end onto a workpiece; and
(c) manually actuatable cam means pivoted on said body and operative to apply such a force to said pivotal clamp arm as to pivot said clamp arm into clamping engagement with the workpiece.

19. A clamping mechanism, comprising in combination:
(a) a body having means by which it may be secured to a support;
(b) a clamp arm pivotally supported on said body for closing at one end onto a workpiece;
(c) cam means pivoted on said body and operative to apply such a force to said pivotal clamp arm as to pivot said clamp arm into clamping engagement with the workpiece; and
(d) actuating means so secured to said cam means as to be slidable along the pivotal axis thereof and being also operative to pivot said cam means.

References Cited by the Examiner
UNITED STATES PATENTS

| | | | |
|---|---|---|---|
| 857,888 | 6/07 | Morden | 83—602 |
| 952,013 | 3/10 | Mignola | 269—236 X |

FRANK SUSKO, *Primary Examiner.*
ROBERT C. RIORDON, *Examiner.*